(12) United States Patent
Li et al.

(10) Patent No.: US 8,350,433 B2
(45) Date of Patent: Jan. 8, 2013

(54) ELECTRIC MOTOR

(75) Inventors: Hu Li, Osaka (JP); Yuichi Yoshikawa, Osaka (JP); Hiroshi Murakami, Osaka (JP)

(73) Assignee: Panasonic Corporation, Osaka (JP)

( * ) Notice: Subject to any disclaimer, the term of this patent is extended or adjusted under 35 U.S.C. 154(b) by 7 days.

(21) Appl. No.: 13/364,653

(22) Filed: Feb. 2, 2012

(65) Prior Publication Data

US 2012/0126651 A1 May 24, 2012

Related U.S. Application Data

(63) Continuation of application No. 12/596,756, filed as application No. PCT/JP2008/000857 on Apr. 3, 2008, now Pat. No. 8,134,266.

(30) Foreign Application Priority Data

May 31, 2007 (JP) .................................. 2007-144790

(51) Int. Cl.
*H02K 21/12* (2006.01)

(52) U.S. Cl. .......... 310/156.36; 310/156.01; 310/156.34

(58) Field of Classification Search ............. 310/156.35, 310/156.13, 156.01–156.84
See application file for complete search history.

(56) References Cited

U.S. PATENT DOCUMENTS

| | | | |
|---|---|---|---|
| 4,672,253 A | 6/1987 | Tajima et al. | |
| 6,452,302 B1 * | 9/2002 | Tajima et al. | 310/216.001 |
| 6,661,147 B2 | 12/2003 | Tajima et al. | |
| 6,940,205 B1 | 9/2005 | Murakami et al. | |
| 7,321,176 B2 * | 1/2008 | Strothmann | 310/156.15 |
| 7,626,299 B2 | 12/2009 | Yoshikawa et al. | |
| 7,676,880 B2 | 3/2010 | Moein et al. | |
| 2004/0232800 A1 | 11/2004 | Seguchi et al. | |
| 2005/0017591 A1 | 1/2005 | Brewster et al. | |
| 2006/0108887 A1 * | 5/2006 | Nitta et al. | 310/156.53 |
| 2008/0169717 A1 | 7/2008 | Takashima et al. | |

FOREIGN PATENT DOCUMENTS

| | | |
|---|---|---|
| JP | 2001-037133 A | 2/2001 |
| JP | 2002-233122 A | 8/2002 |
| JP | 2004-248378 A | 9/2004 |
| JP | 2005-137117 A | 5/2005 |
| JP | 2006-187176 A | 7/2006 |

OTHER PUBLICATIONS

International Search Report for Application No. PCT/JP2008/000857, May 13, 2008, Panasonic Corporation.
Japanese Office Action for Application No. 2009-516163, Oct. 18, 2011, Panasonic Corporation.

* cited by examiner

*Primary Examiner* — Quyen Leung
*Assistant Examiner* — Leda Pham
(74) *Attorney, Agent, or Firm* — RatnerPrestia

(57) ABSTRACT

It comprises stator including stator core having yoke and a plurality of teeth protruded from yoke, which is formed with slots between adjacent teeth, and rotor having rotor core and permanent magnet formed with a plurality of magnetic poles, which confronts tip ends of teeth via gaps, wherein rotor core is formed by rotor core materials circumferentially equally divided into the predetermined number of divisions, and the least common multiple being N for the number of slots and the number of magnetic poles and the least common multiple being M for the number of slots and the number of divisions, then N is equal to M.

4 Claims, 15 Drawing Sheets

ELECTRIC MOTOR

This application is a continuation of U.S. patent application Ser. No. 12/596,756, filed Oct. 20, 2009, which is a U.S. National Phase Application of PCT International Application PCT/JP2008/000857, filed Apr. 3, 2008, the entire disclosures of which are incorporated herein by reference.

TECHNICAL FIELD

The present invention relates to an electric motor using a rotor core formed by a plurality of circumferentially divided rotor core materials.

BACKGROUND ART

As to a rotor core formed by a plurality of circumferentially divided rotor core materials, technology as mentioned in Patent document 1 is commonly known. The technology mentioned in Patent document 1 is such that these rotor core materials are connected to each other with some play provided via junctions in such manner as to be positioned in an annular fashion. And, in this condition, they are set in a mold and integrated into one piece by a steel frame and resin in the mold.

Due to the technology mentioned in Patent document 1, when rotor core materials are set in a mold, rotor core materials are connected to each other with some play provided via junctions, and therefore, the rotor core materials can be set in the mold while providing clearance between the mold and the rotor core. In this way, it is possible to improve the workability. Also, when resin is used for the purpose of molding, the rotor core is pressed in the direction of inner diameter due to the resin molding pressure, causing the play between rotor core materials to be removed, and it is possible to secure the dimensional accuracy.

However, when a rotor core formed by rotor core materials as mentioned in Patent document 1 is used, gaps are generated between rotor core materials. As a result, abrupt change of the magnetic flux is generated between the rotor core material and the gap. This gives rise to the problem of increase of cogging torque and torque ripple.

Patent document 1 Unexamined Japanese Patent Publication 2006-187176

SUMMARY OF THE INVENTION

The electric motor of the present invention has a configuration as described in the following.

That is, it comprises a stator including a stator core having a yoke and a plurality of teeth protruded from the yoke, which is formed with slots between the teeth adjacent to each other and winding wound around the stator core, and a rotor rotatably held against the stator, having a rotor core and a plurality of magnetic poles held by the rotor core and confronting tip ends of the teeth via gaps. The rotor core is formed by rotor core materials circumferentially equally divided into a predetermined number of divisions. And, the least common multiple being N for the number of slots and the number of magnetic poles, and the least common multiple being M for the number of slots and the number of divisions, then N is equal to M in the configuration.

In this configuration, the characteristic of cogging torque obtained is same as in the case of using a rotor core integrally formed. Accordingly, it is possible to reduce cogging torque and torque ripple while using a rotor core formed by a plurality of rotor core materials.

Figure 1:
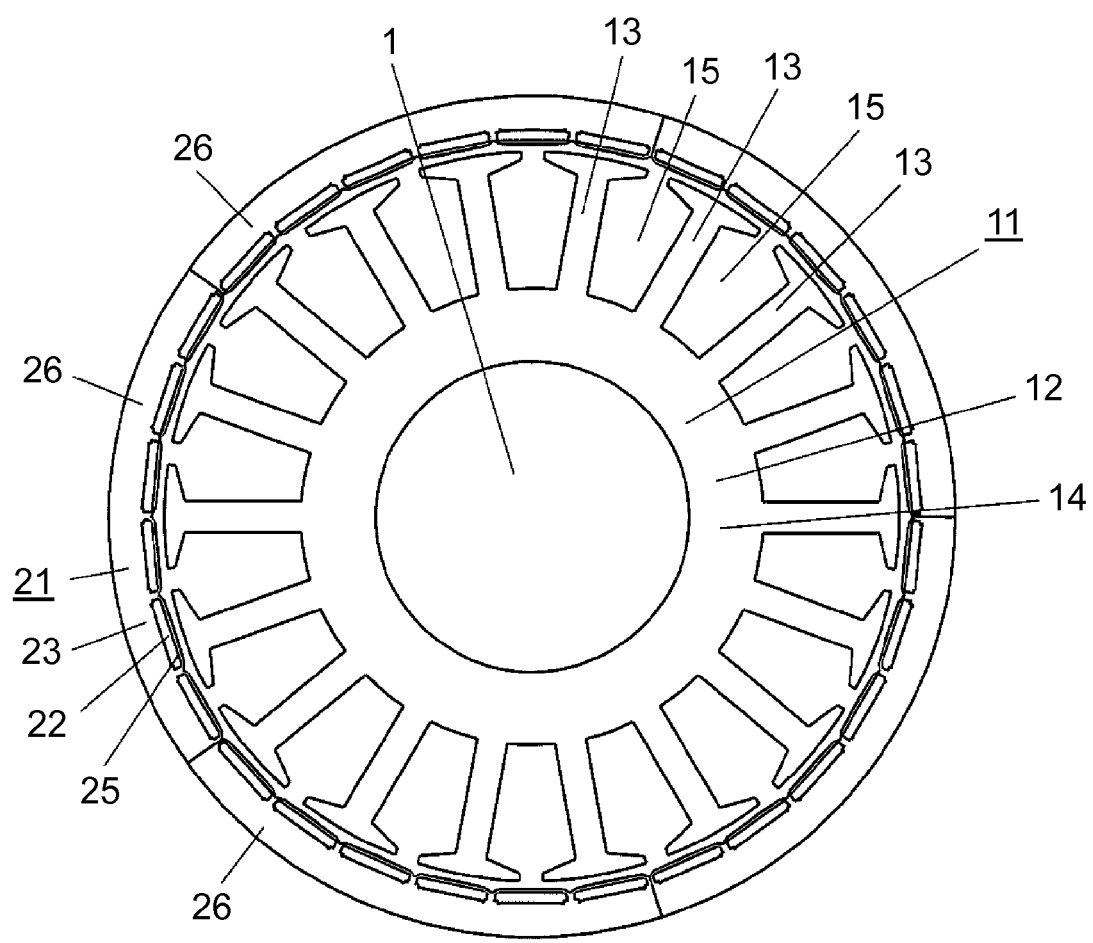
FIG. 1 is a sectional view of an electric motor in the preferred embodiment 1 of the present invention.

DESCRIPTION OF REFERENCE MARKS 1, 100 Rotary shaft
11, 111 Stator
12, 112 Yoke
13 Teeth
14, 114 Stator core
15 Slot
21 Rotor
22, 222, 232 Magnet burying hole
23 Rotor core
25, 225, 235 Permanent magnet
26 Rotor core material
113 Outer teeth
115 Outer slot
123 Inner teeth
125 Inner slot
221 Outer rotor
223 Outer rotor core
226 Outer rotor core material
231 Inner rotor
233 Inner rotor core
236 Inner rotor core material

PREFERRED EMBODIMENTS FOR CARRYING OUT THE INVENTION

The preferred embodiments of the present invention will be described in the following with reference to the drawings.

Preferred Embodiment 1

FIG. 1 is a sectional view of an electric motor in the preferred embodiment 1 of the present invention.

The electric motor in the preferred embodiment 1 comprises stator 11 and rotor 21.

Stator 11 includes stator core 14 formed for example by punching by a press and laminating a plurality of thin steel sheets having high magnetic permeability, and winding (not shown) wound around stator core 14. Stator core 14 has nearly annular yoke 12 and a plurality of teeth 13 protruding outward from yoke 12, and slot 15 is formed between teeth 13 adjacent to each other. The winding is wound around stator core 14 in a concentrated fashion and housed in slot 15.

Rotor 21 includes rotor core 23 formed with a plurality of magnet burying holes 22, and permanent magnets 25 to be buried in respective magnet burying holes 22. Permanent magnets 25 are disposed for forming magnetic poles at rotor 21, and such permanent magnets 25 are kept and housed in respective magnet burying holes 22.

Rotor 21 having such a configuration is arranged outside the stator 11 and confronts the tip ends of teeth 13 of stator 11 via gaps. Rotor 21 is fixed via a bottomed cylindrical rotor cup (not shown) fixed on the bottom against rotary shaft 1 and rotatably journaled on stator 11.

And, rotor core 23 is formed by a plurality of rotor core materials 26. Rotor core materials 26 have such a structure that rotor core 23 is circumferentially equally divided into a predetermined number of divisions. Rotor core 23 is formed by combining such rotor core materials 26 for the number of divisions.

Rotor core material 26 is formed with a convex-concave shape at a portion where it is combined with adjacent rotor core material 26. And, adjacent rotor core materials 26 are secured with their convex and concave shapes engaged with each other. The combination of adjacent rotor core materials 26 is also allowable to be secured by using adhesive instead of engaging the convex shape with the concave shape.

Figure 2:
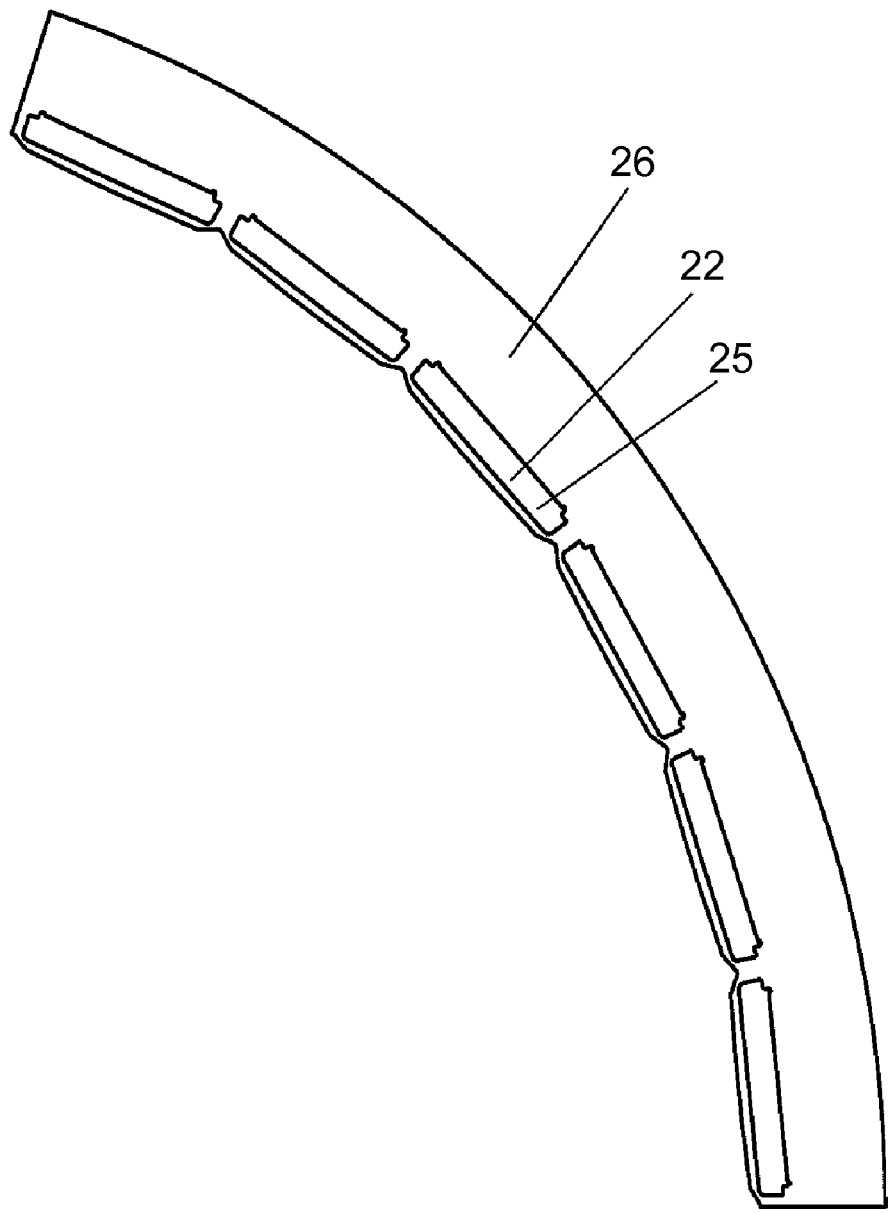
FIG. 2 is a partially enlarged view of one rotor core material of the rotor core of FIG. 1.

FIG. 2 is a partially enlarged view of one rotor core material 26 of rotor core 23 of FIG. 1.

Rotor core 23 in the preferred embodiment 1 is formed by rotor core materials 26 circumferentially divided into 5 divisions as the predetermined number of divisions so that they are spaced apart at equal intervals. In the present preferred embodiment 1, the number of slots S of stator 11 is 18, and the number of poles P of rotor 21 is set to 30. Also, rotor core 23 is formed by five rotor core materials 26, and therefore, the number of divisions D is 5. Accordingly, the least common multiple being N for the number of slots S and the number of magnetic poles P, then the number of slots S is 18 and the number of poles P is 30. Therefore, the least common multiple N is 90. Also, the least common multiple being M for the number of slots S and the number of divisions D, then the number of slots S is 18 and the number of divisions D is 5. Therefore, the least common multiple M is also 90. That is, in the present preferred embodiment 1, N=M (N is equal to M).

The reason for N=M in the present preferred embodiment 1 is explained in the following. Regarding the relationship between rotor rotating position and cogging torque, the description is given in the following by using an example of comparison, changing the number of slots S of rotor core, the number of magnetic poles S, and the number of divisions D.

Figure 3:
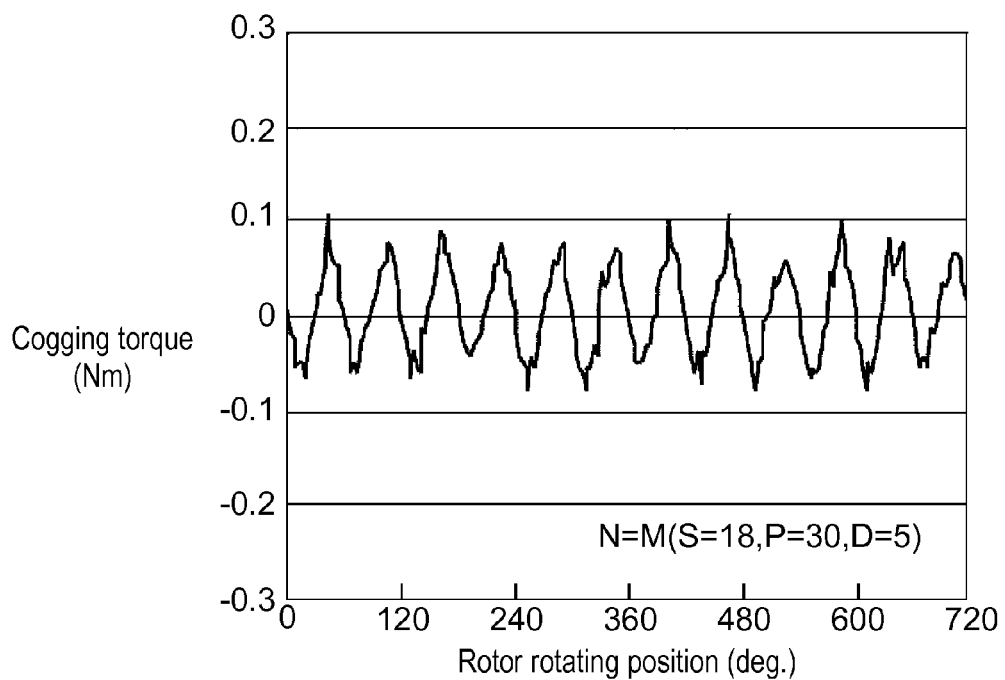
FIG. 3 shows the relationship between the rotor rotating position and cogging torque of the electric motor in the preferred embodiment 1.

First, FIG. 3 shows the relationship between rotor rotating position and cogging torque of the electric motor in the preferred embodiment 1. That is, FIG. 3 shows the relationship between rotor rotating position and cogging torque where the number of slots S is 18, the number of poles P is 30, and the number of divisions D is 5. As shown in FIG. 3, in the case of the electric motor in the preferred embodiment 1, the maximum value and minimum value of cogging torque are nearly identical with each other every cycle of cogging torque. And, the cogging torque is generated in a range of about −0.1N·m to 0.1 N·m.

Figure 4:
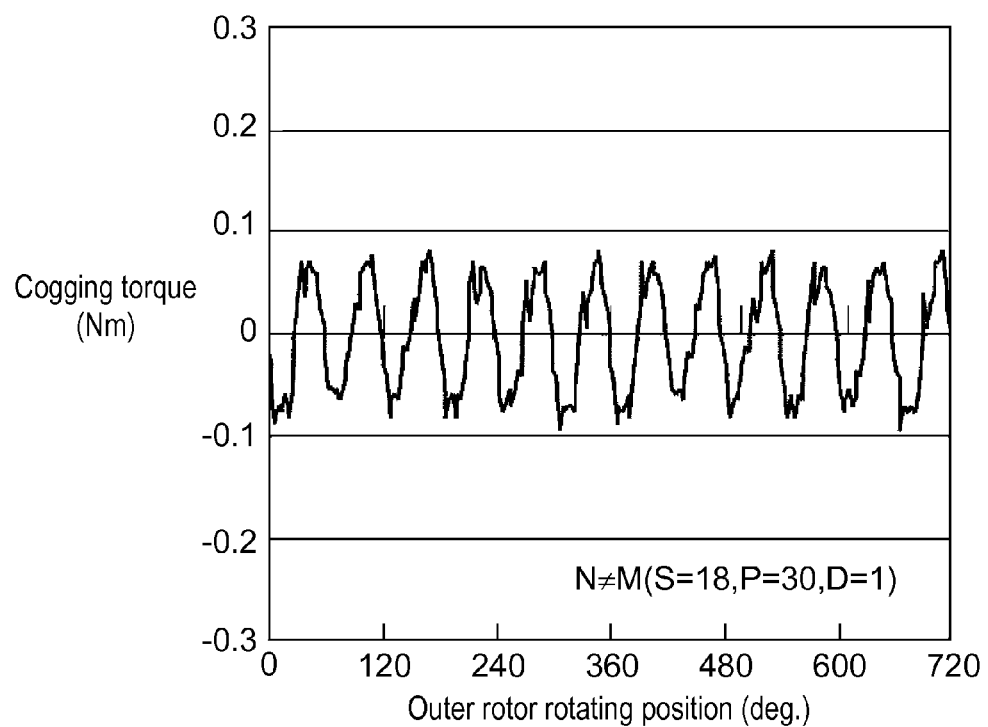
FIG. 4 shows the relationship between the rotor rotating position and cogging torque with the rotor core of the electric motor integrally formed, where the number of slots S is 18 and the number of poles P is 30.

Next, FIG. 4 shows the relationship between rotor rotating position and cogging torque with the rotor core of the electric motor integrally formed where the number of slots S is 18 and the number of poles S is 30. That is, in the electric motor having characteristics shown in FIG. 4, the rotor core is integrally formed, and the number of rotor core materials is 1, and the number of divisions D is 1. In this case, N is not equal to M, but the rotor core is integrally formed, therefore as shown in FIG. 4, the cogging torque is reduced to a value ranging from −0.1N·m to 0.1N·m.

Described next is such a case that the rotor core is divided into a plurality of portions and N is not equal to M.

Figure 5A:
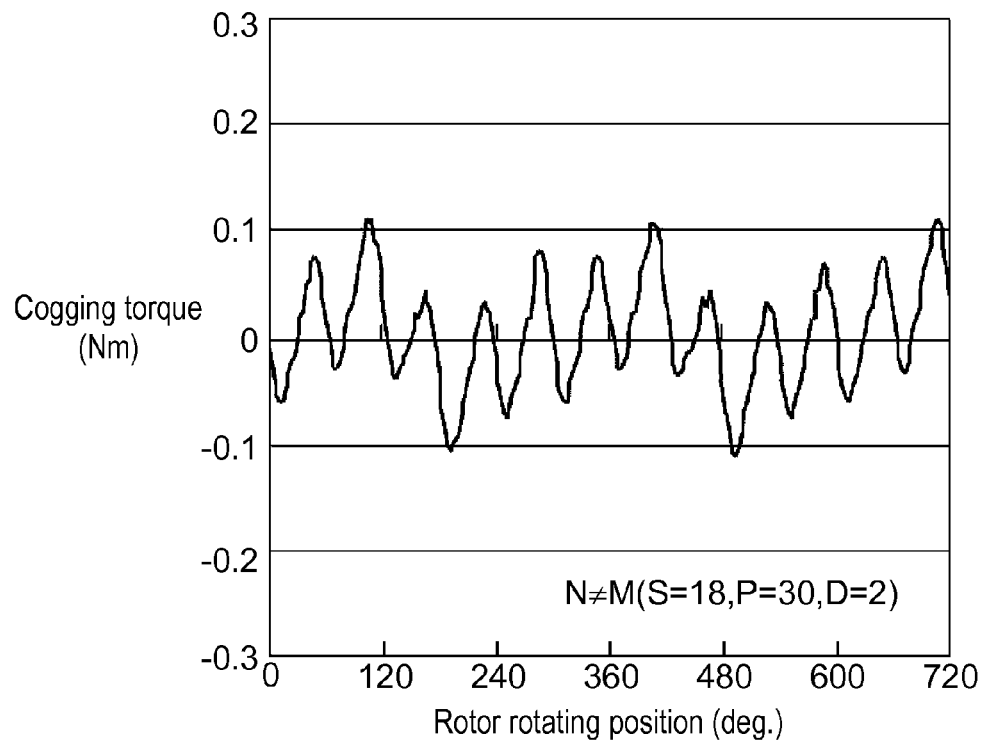
FIG. 5A shows the relationship between rotor rotating position and cogging torque where N≠M (number of slots S=18, number of poles P=30, number of divisions D=2).
Figure 5B:
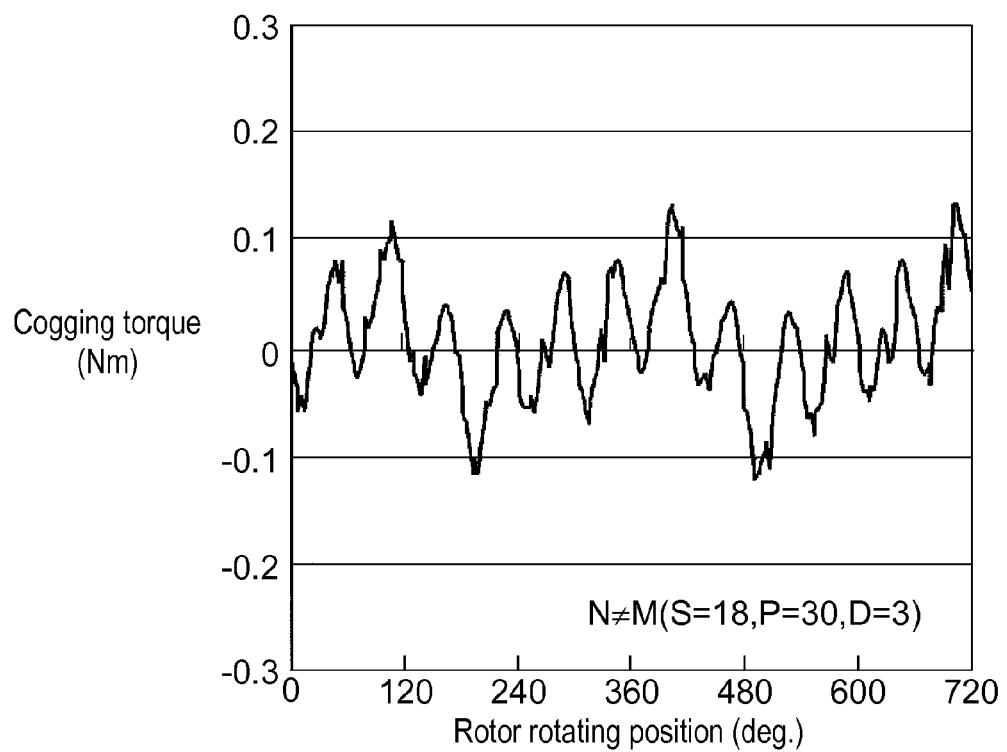
FIG. 5B shows the relationship between rotor rotating position and cogging torque where N≠M (number of slots S=18, number of poles P=30, number of divisions D=3).
Figure 5C:
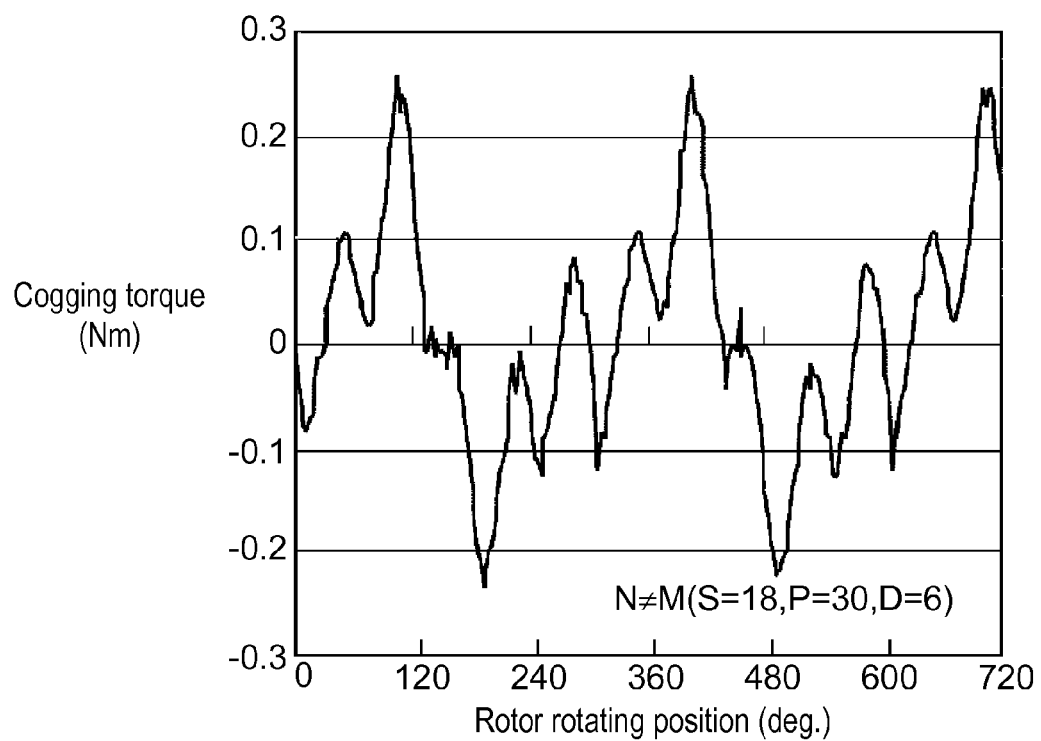
FIG. 5C shows the relationship between rotor rotating position and cogging torque where N≠M (number of slots S=18, number of poles P=30, number of divisions D=6).

FIG. 5A shows the relationship between rotor rotating position and cogging torque where N≠M (number of slots S=18, number of poles P=30, number of divisions D=2). FIG. 5B shows the relationship between rotor rotating position and cogging torque where N≠M (number of slots S=18, number of poles P=30, number of divisions D=3). FIG. 5C shows the relationship between rotor rotating position and cogging torque where N≠M (number of slots S=18, number of poles P=30, number of divisions D=6).

As shown in FIG. 5A to FIG. 5C, when N≠M, the cogging torque varies in maximum value and minimum value every cycle of cogging torque. And, it gives rise to the occurrence of such rotor rotating position that the cogging torque exceeds the range of −0.1N·m to 0.1N·m.

Described next is such a case that the rotor core is divided into a plurality of portions the same as in the preferred embodiment 1, and N is equal to M.

Figure 6A:
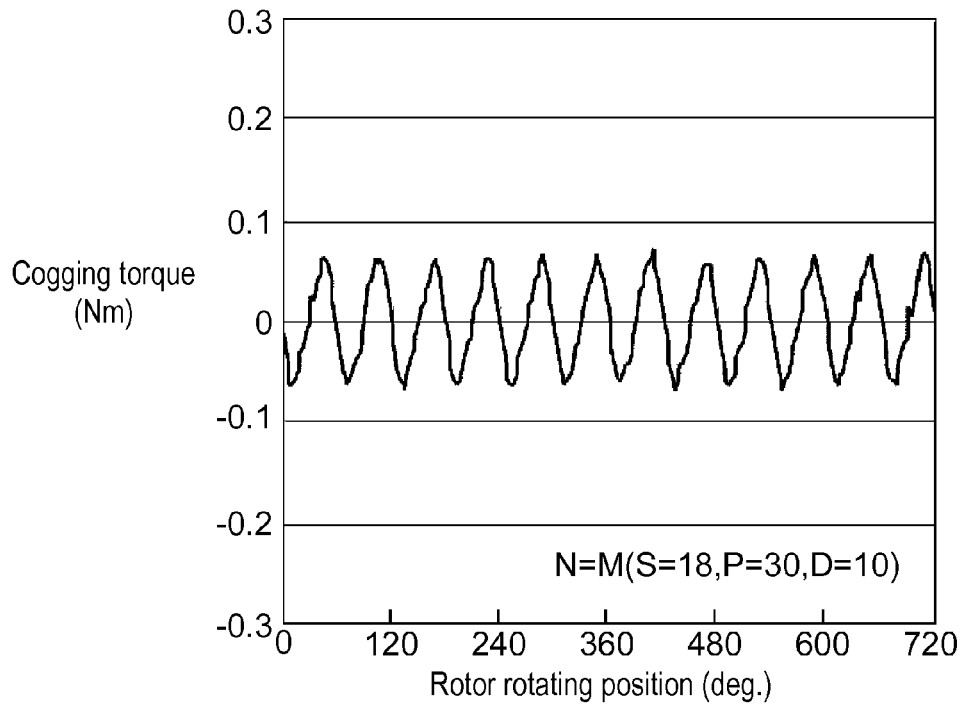
FIG. 6A shows the relationship between rotor rotating position and cogging torque where N=M (number of slots S=18, number of poles P=30, number of divisions D=10).
Figure 6B:
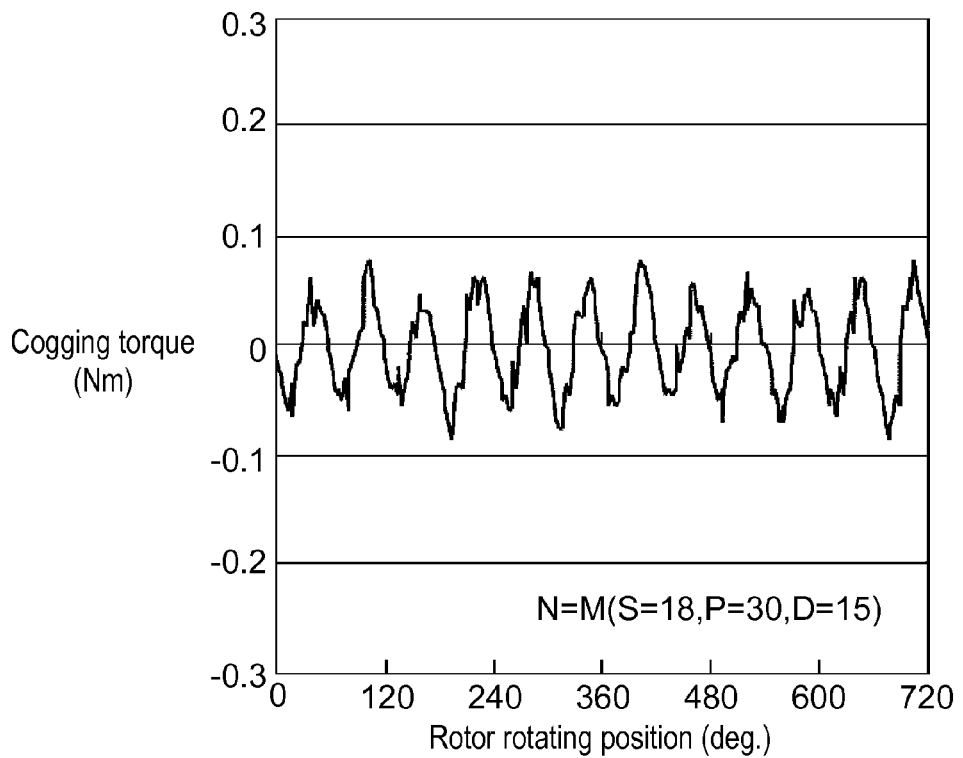
FIG. 6B shows the relationship between rotor rotating position and cogging torque where N=M (number of slots S=18, number of poles P=30, number of divisions D=15).
Figure 6C:
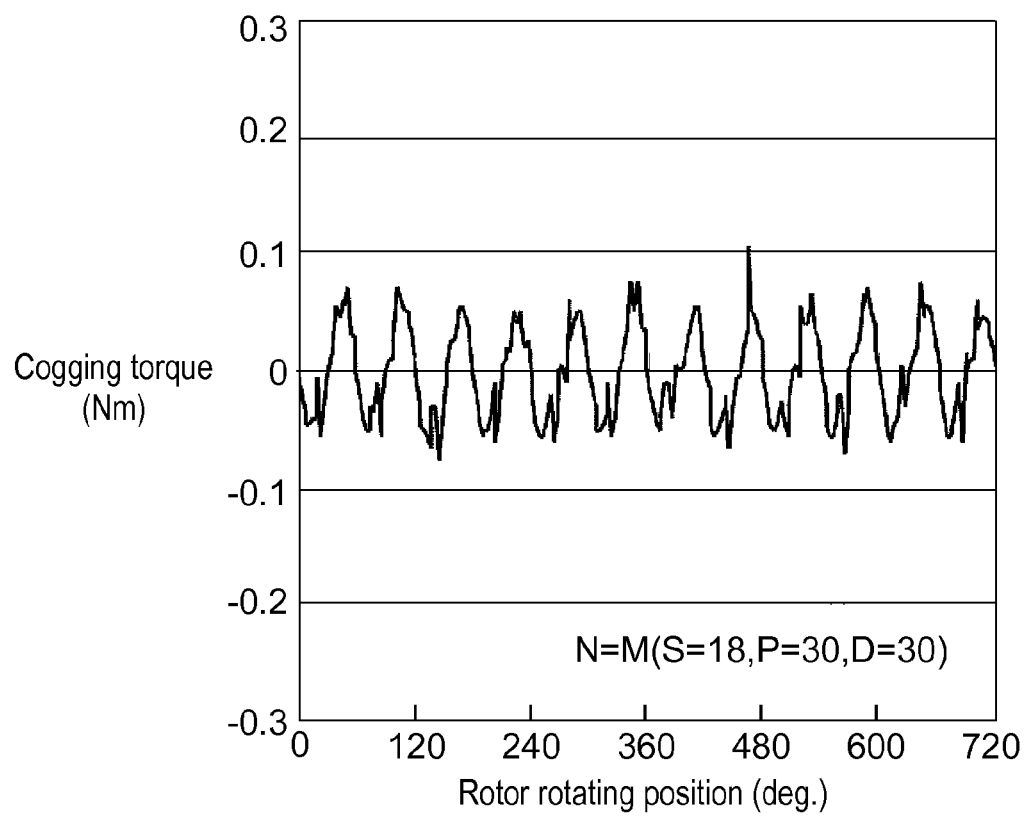
FIG. 6C shows the relationship between rotor rotating position and cogging torque where N=M (number of slots S=18, number of poles P=30, number of divisions D=30).

FIG. 6A shows the relationship between rotor rotating position and cogging torque where N=M (number of slots S=18, number of poles P=30, number of divisions D=10). FIG. 6B shows the relationship between rotor rotating position and cogging torque where N=M (number of slots S=18, number of poles P=30, number of divisions D=15). FIG. 6C shows the relationship between rotor rotating position and cogging torque where N=M (number of slots S=18, number of poles P=30, number of divisions D=30).

As shown in FIG. 6A to FIG. 6C, when N=M, as compared with the case of N≠M, the characteristic of cogging torque generation is similar to the generation of cogging torque with the rotor core integrally formed as shown in FIG. 4. That is, when N=M, even in case of changing the number of divisions D, the maximum value and minimum value of cogging torque are nearly identical with each other every cycle of cogging torque. And, cogging torque is generated in a range of −0.1N·m to 0.1N·m. That is, when N=M, cogging torque is generated in a range of −0.1N·m to 0.1N·m even with the rotor rotating position varied.

Described next is such a case that the number of slots S and the number of poles P are changed.

Figure 7:
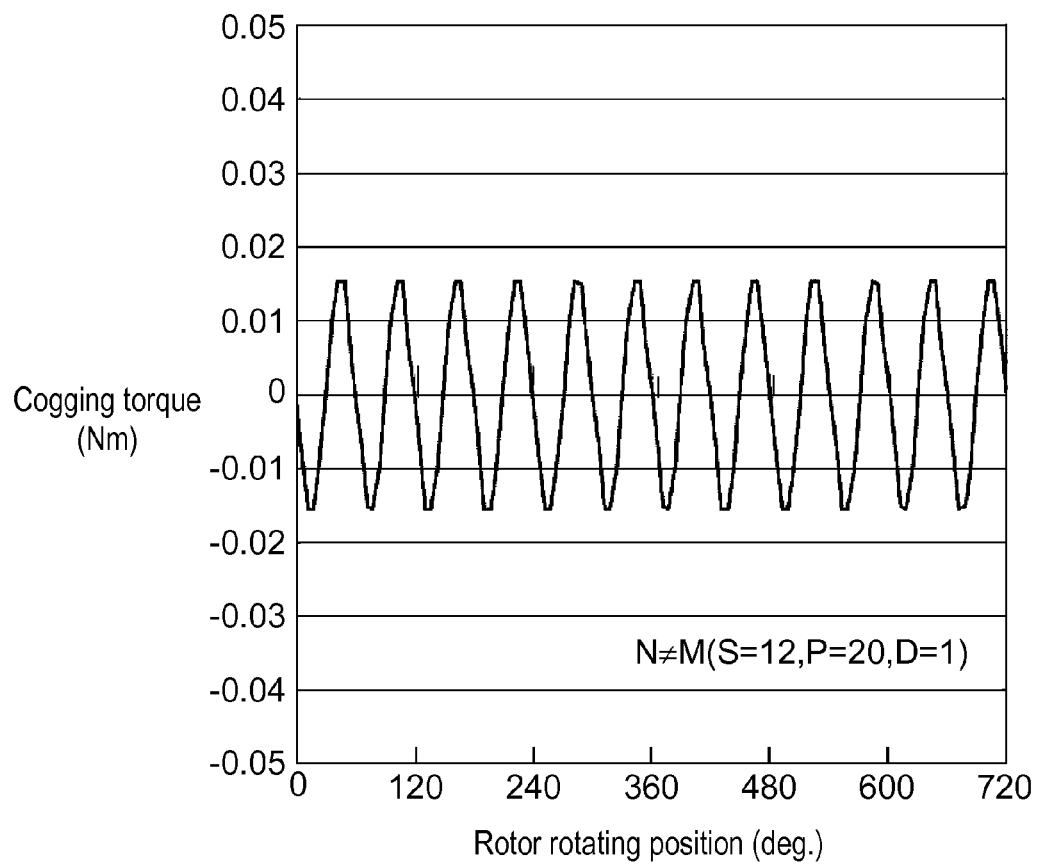
FIG. 7 shows the relationship between rotor rotating position and cogging torque with the rotor core of the electric motor integrally formed, where the number of slots S is 12, and the number of poles P is 20.

First, FIG. 7 shows the relationship between rotor rotating position and cogging torque with the rotor core of the electric motor integrally formed where the number of slots S is 12 and the number of poles P is 20. That is, in the electric motor having characteristics shown in FIG. 7, the rotor core is integrally formed, therefore the number of rotor core materials is 1, and the number of divisions D is 1. In this case, N is not equal to M, but the rotor core is integrally formed, therefore as shown in FIG. 7, the cogging torque is reduced to a value ranging from −0.02N·m to 0.02N·m.

Described next is such a case that the rotor core is divided into a plurality of portions and N is not equal to M.

Figure 8A:
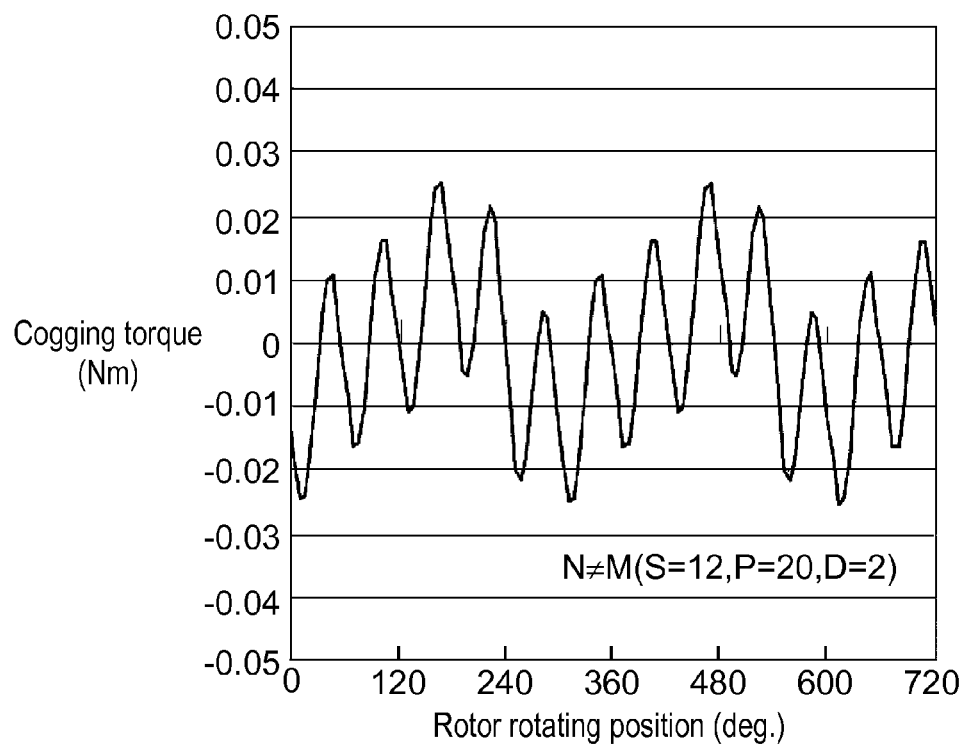
FIG. 8A shows the relationship between rotor rotating position and cogging torque where N=M (number of slots S=12, number of poles P=20, number of divisions D=2).
Figure 8B:
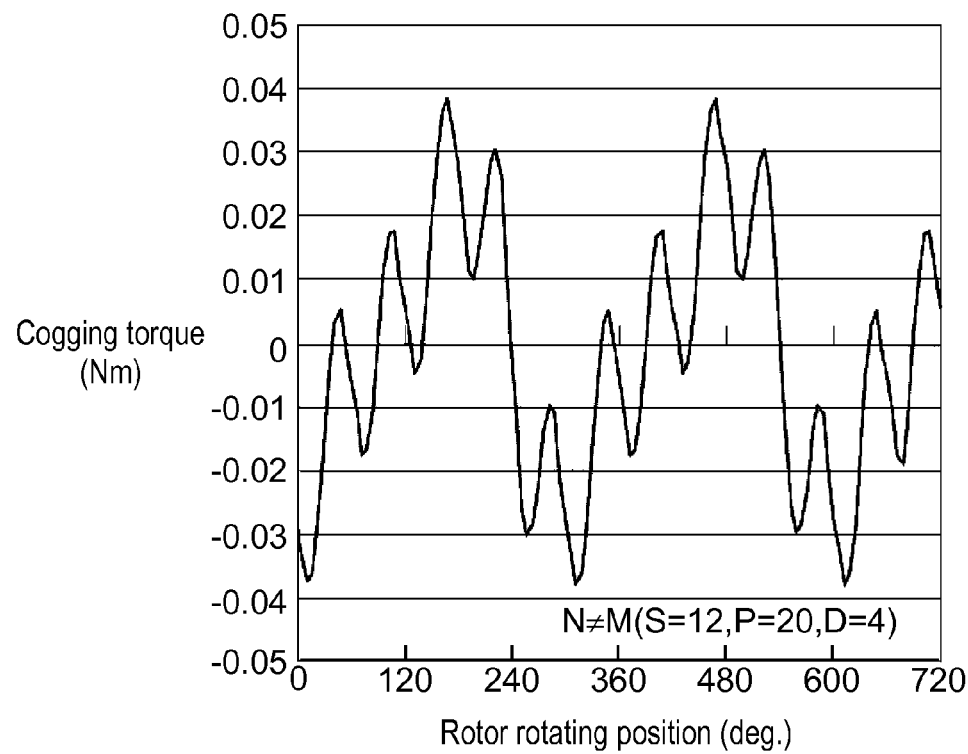
FIG. 8B shows the relationship between rotor rotating position and cogging torque where N≠M (number of slots S=12, number of poles P=20, number of divisions D=4).

FIG. 8A shows the relationship between rotor rotating position and cogging torque where N≠M (number of slots S=12, number of poles P=20, number of divisions D=2). FIG. 8B shows the relationship between rotor rotating position and cogging torque where N≠M (number of slots S=12, number of poles P=20, number of divisions D=4).

As shown in FIG. 8A and FIG. 8B, when N≠M, even with the number of slots S and the number of poles P changed, the cogging torque varies in maximum value and minimum value every cycle of cogging torque. And, it gives rise to the occurrence of such a rotor rotating position that the cogging torque exceeds the range of −0.02N·m to 0.02N·m.

Described next is such a case that the number of slots S and the number of poles P are equal to those with the rotor core integrally formed, the rotor core is divided into a plurality of portions, and N is equal to M.

Figure 9A:
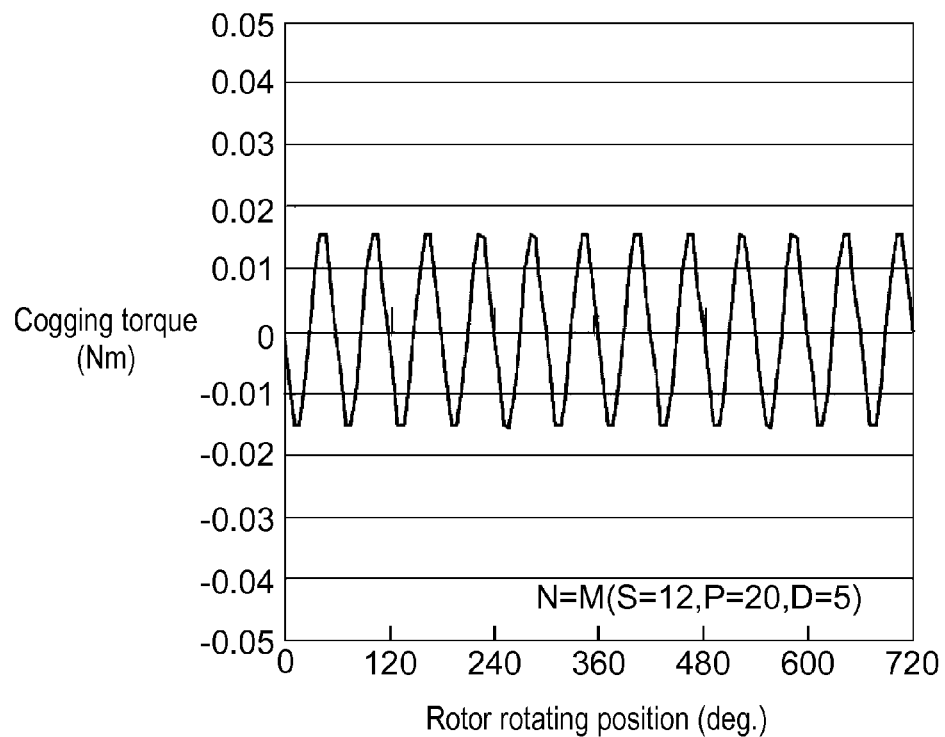
FIG. 9A shows the relationship between rotor rotating position and cogging torque where N=M (number of slots S=12, number of poles P=20, number of divisions D=5).
Figure 9B:
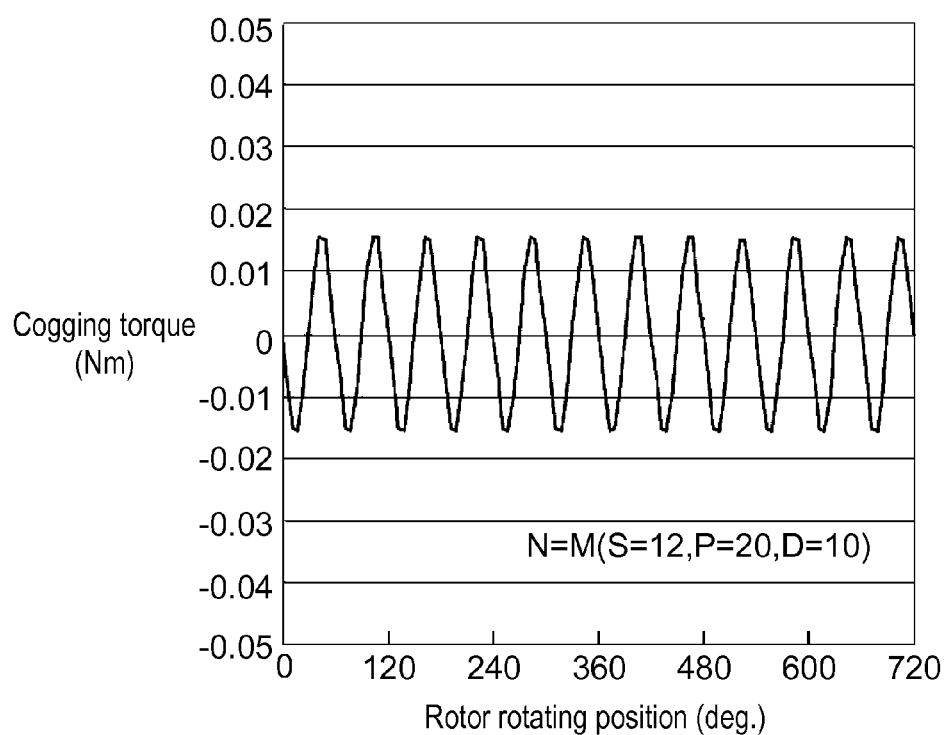
FIG. 9B shows the relationship between rotor rotating position and cogging torque where N=M (number of slots S=12, number of poles P=20, number of divisions D=10).
Figure 9C:
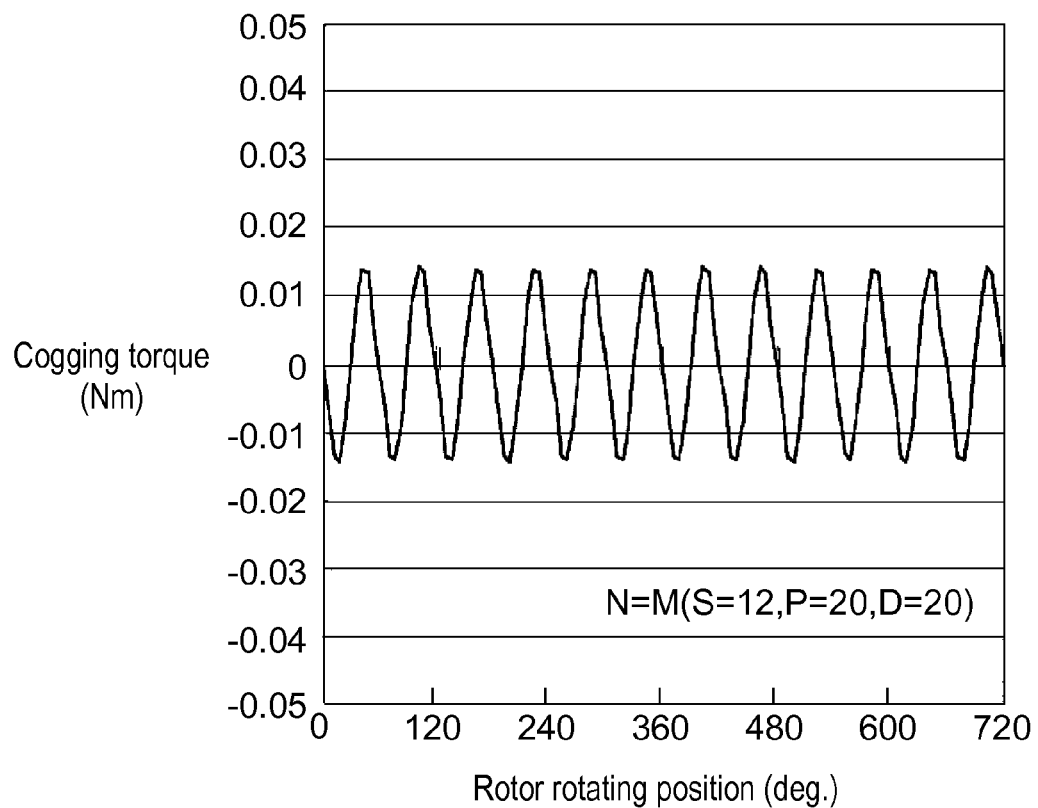
FIG. 9C shows the relationship between rotor rotating position and cogging torque where N=M (number of slots S=12, number of poles P=20, number of divisions D=20).

FIG. 9A shows the relationship between rotor rotating position and cogging torque where N=M (number of slots S=12, number of poles P=20, number of divisions D=5). FIG. 9B shows the relationship between rotor rotating position and cogging torque where N=M (number of slots S=12, number of poles P=20, number of divisions D=10). FIG. 9C shows the relationship between rotor rotating position and cogging torque where N=M (number of slots S=12, number of poles P=20, number of divisions D=20).

As shown in FIG. 9A to FIG. 9C, when N=M, as compared with the case of N≠M, the characteristic of cogging torque generation is similar to the generation of cogging torque with the rotor core integrally formed as shown in FIG. 7. That is, when N=M, even in case of changing the number of divisions D, the maximum value and minimum value of cogging torque are nearly identical with each other every cycle of cogging torque. And, cogging torque is generated in a range of −0.02N·m to 0.02N·m.

As described above, the electric motor in the preferred embodiment 1 comprises rotor core 23 formed by rotor core materials 26 circumferentially equally divided into a predetermined number of divisions, wherein the least common multiple N for the number of slots S and the number of magnetic poles P is equal to the least common multiple M for the number of slots S and the number of divisions D. Therefore, even in case of using rotor core 23 formed by a plurality of rotor core materials 26, it is possible to obtain same cogging torque characteristics as in the case of using a rotor core integrally formed. Accordingly, according to the present invention, cogging torque can be reduced in an electric motor having a rotor core formed by a plurality of rotor core materials, and also, it is possible to reduce torque ripple related with cogging torque.

In the description of the preferred embodiment 1, a stator whose number of slots S is 18 and a rotor whose number of poles P is 30 are used for the sake of convenience in the description, but as described above, it is not limited to this combination, and when N=M, it is allowable to employ whichever combinations of the number of slots S, the number of magnetic poles P, and the number of divisions D that is the number of rotor core materials.

Also, in the preferred embodiment 1, an example of configuration with rotor 21 arranged outside the stator 11 is mentioned in the description, but it is also allowable to arrange rotor 21 inside the stator 11. That is, it is allowable to be configured in that the stator core has a plurality of teeth protruding inward of the yoke, and the rotor inside the stator confronts tip ends of the teeth via gaps. This is because cogging torque is related with air gap permeance and magnetomotive force between stator and rotor, and it can be considered that cogging torque is generated in a similar pattern when the number of slots S, the number of magnetic poles P, and the number of divisions D are same in combination.

Preferred Embodiment 2

The preferred embodiment 2 of the present invention will be described in the following with reference to the drawings.

Figure 10:
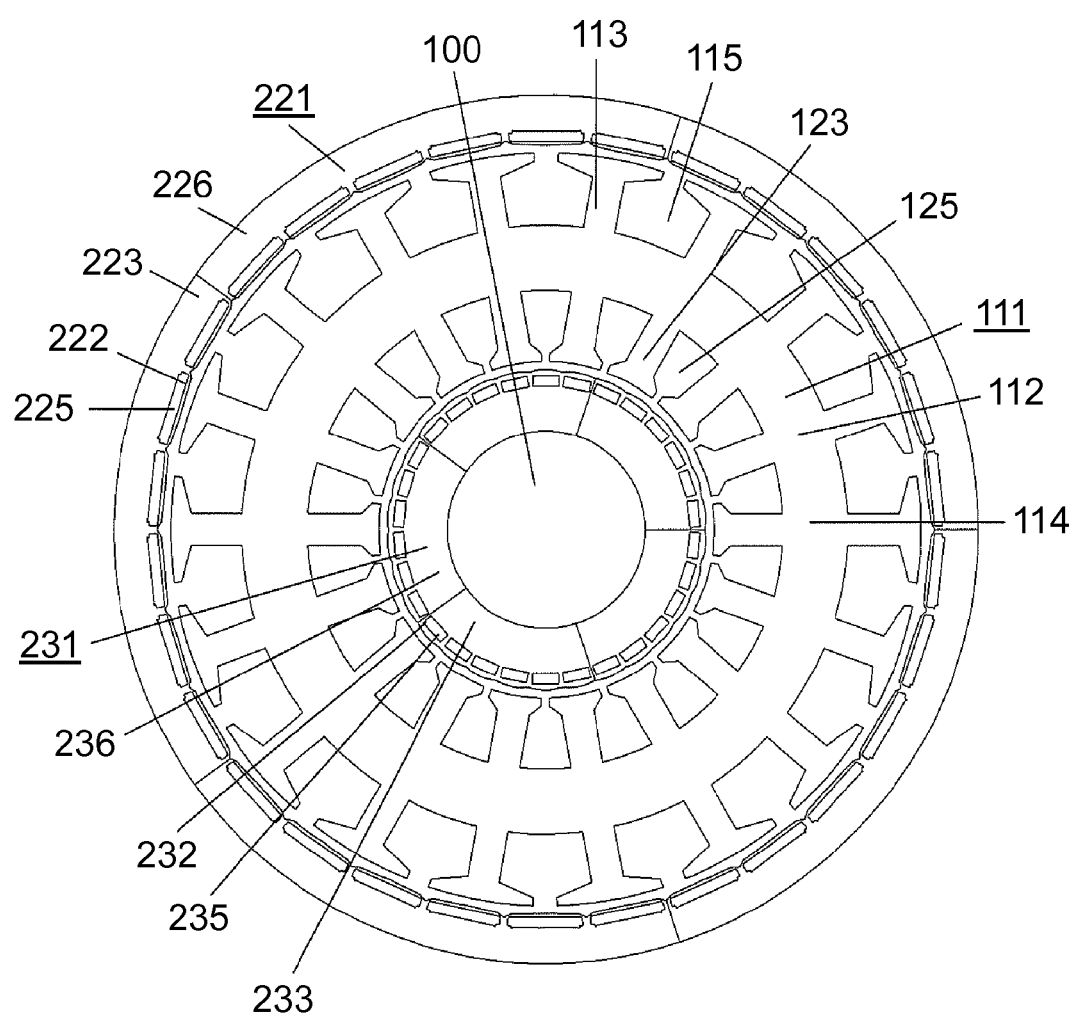
FIG. 10 is a sectional view of an electric motor in the preferred embodiment 2 of the present invention.

FIG. 10 is a sectional view of an electric motor in the preferred embodiment 2 of the present invention.

The electric motor in the preferred embodiment 2 comprises stator 111, outer rotor 221, and inner rotor 231.

Stator 111 includes stator core 114 formed for example by punching by a press and laminating a plurality of thin steel sheets having high magnetic permeability, and winding (not shown) wound around stator core 114. Stator core 114 has nearly annular yoke 112, a plurality of outer teeth 113 protruding outward from yoke 112, and a plurality of inner teeth 123 protruded inward from yoke 112. Also, stator core 114 is formed with outer slot 115 between outer teeth 113 adjacent to each other, and with inner slot 125 between inner teeth 123 adjacent to each other. As to the winding system for winding around stator core 114, it is allowable to employ any one of a toroidal system, concentrated winding system, and distributed winding system.

Outer rotor 221 includes outer rotor core 223 formed with a plurality of magnet burying holes 222, and permanent magnets 225 to be buried in respective magnet burying holes 222. Inner rotor 231 includes inner rotor core 233 formed with a plurality of magnet burying holes 232, and permanent magnet 235 to be buried in respective magnet burying holes 232.

Permanent magnet 225 and permanent magnet 235 are disposed for the purpose of forming magnetic poles at each rotor.

Also, outer rotor 221 and inner rotor 231 are connected to each other. For making this connection, it is allowable to use adhesive or bolts or resin for molding. And, outer rotor 221 and inner rotor 231 are connected to rotary shaft 100 via such adhesive or molding material.

Outer rotor 221 confronts the outer peripheral tip ends of outer teeth 113 via gaps. Also, inner rotor 231 confronts the inner peripheral tip ends of inner teeth 123 via gaps. And, outer rotor 221 and inner rotor 231 are rotatably journaled against stator 111.

And, outer rotor core 223 and inner rotor core 233 in the preferred embodiment 2 are respectively formed by a plurality of rotor core materials. Same as in the preferred embodiment 1, the rotor core materials in each rotor core has a structure circumferentially equally divided into the predetermined number of divisions. Such rotor core materials are combined for the number of divisions to form a rotor core.

As shown in FIG. 10, outer rotor core 223 comprises outer rotor core materials 226 circumferentially divided into five portions as the predetermined number of divisions in such manner that they are equally spaced apart. Inner rotor core 233 comprises inner rotor core materials 236 circumferentially divided into 5 portions as the predetermined number of divisions in such manner that they are equally spaced apart.

In the preferred embodiment 2, the number of outer slots So of stator 111 is 18, and the number of magnetic poles Po of outer rotor 221 is set to 30. Also, outer rotor core 223 is formed by five pieces of outer rotor core materials 226, and therefore, the number of divisions Do in outer rotor core 223 is 5. Accordingly, the least common multiple being Nout for the number of outer slots So and the number of outer magnetic poles Po, then the number of outer slots So is 18, and the number of magnetic poles Po is 30, therefore the least common multiple Nout for these is 90. Also, the least common multiple being Mout for the number of outer slots So and the number of divisions Do, then the number of outer slots So is 18, and the number of divisions Do is 5, therefore the least common multiple Mout for these is also 90. That is, in the preferred embodiment 2, Nout=Mout (Nout is equal to Mout).

Also, in the preferred embodiment 2, the number of inner slots Si of stator 111 is 18, and the number of magnetic poles Pi of inner rotor 231 is set to 30. Also, the number of divisions Di of inner rotor core 233 is 5. Accordingly, the least common multiple being Nin for the number of inner slots Si and the number of inner magnetic poles Pi, then the least common multiple Nin for these is 90. Also, the least common multiple being Min for the number of inner slots Si and the number of divisions Di, then the least common multiple Min for these is also 90. That is, in the preferred embodiment 2, Nin=Min (Nin is equal to Min).

The reason for Nout=Mout and Nin=Min in the preferred embodiment 2 is described in the following. Regarding the relationship between rotor rotating position and cogging torque, the description is given in the following by using an example of comparison.

First, the reason for Nout=Mout in the preferred embodiment 2 is described.

Figure 11:
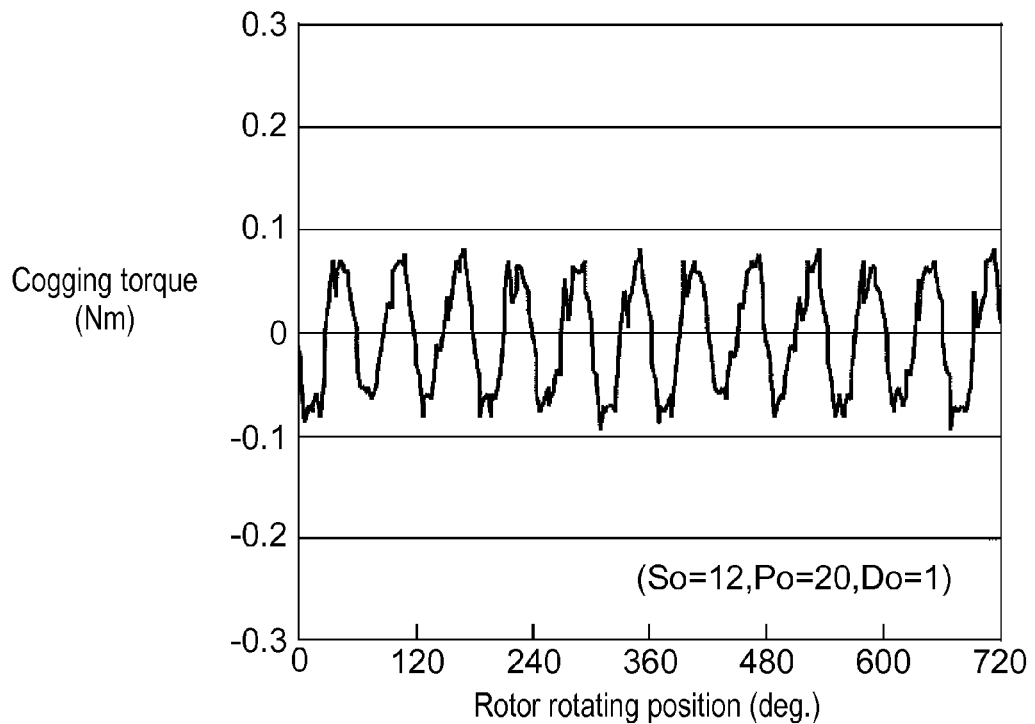
FIG. 11 shows the relationship between outer rotor rotating position and cogging torque with the outer rotor core integrally formed.

FIG. 11 shows the relationship between outer rotor rotating position and cogging torque with the outer rotor core integrally formed.

Figure 12:
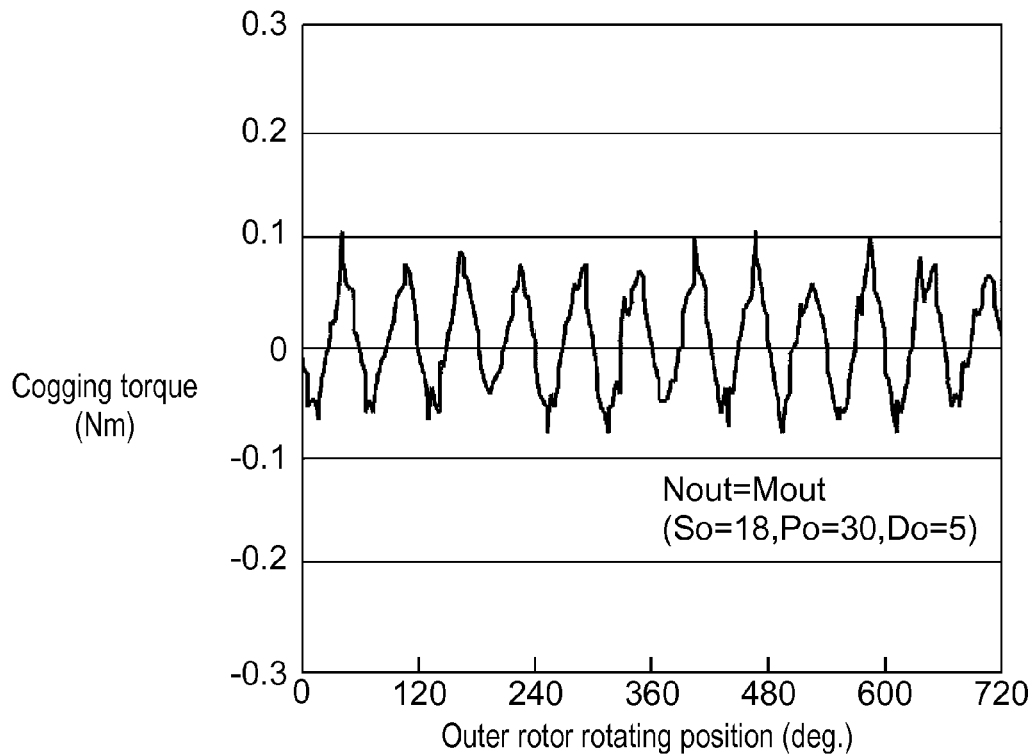
FIG. 12 shows the relationship between outer rotor rotating position and cogging torque where Nout=Mout (number of outer slots So=18, number of outer rotor poles Po=30, number of outer rotor core divisions Do=5).

Also, FIG. 12 shows the relationship between outer rotor rotating position and cogging torque where Nout=Mout (number of outer slots So=18, number of poles Po of outer rotor 221=30, number divisions Do of outer rotor core 223=5).

The cogging torque shown in FIG. 11 and FIG. 12 is measured supposing that cogging torque generated due to the inner rotor is zero.

As shown in FIG. 12, when Nout=Mout, the characteristic of cogging torque generation is similar to the generation of cogging torque with the outer rotor core integrally formed as shown in FIG. 11. That is, the maximum value and minimum value of cogging torque are nearly identical with each other every cycle of cogging torque. And, the cogging torque is generated within a range of −0.1N·m to 0.1N·m.

The reason for Nin=Min in the preferred embodiment 2 is described in the following.

Figure 13:
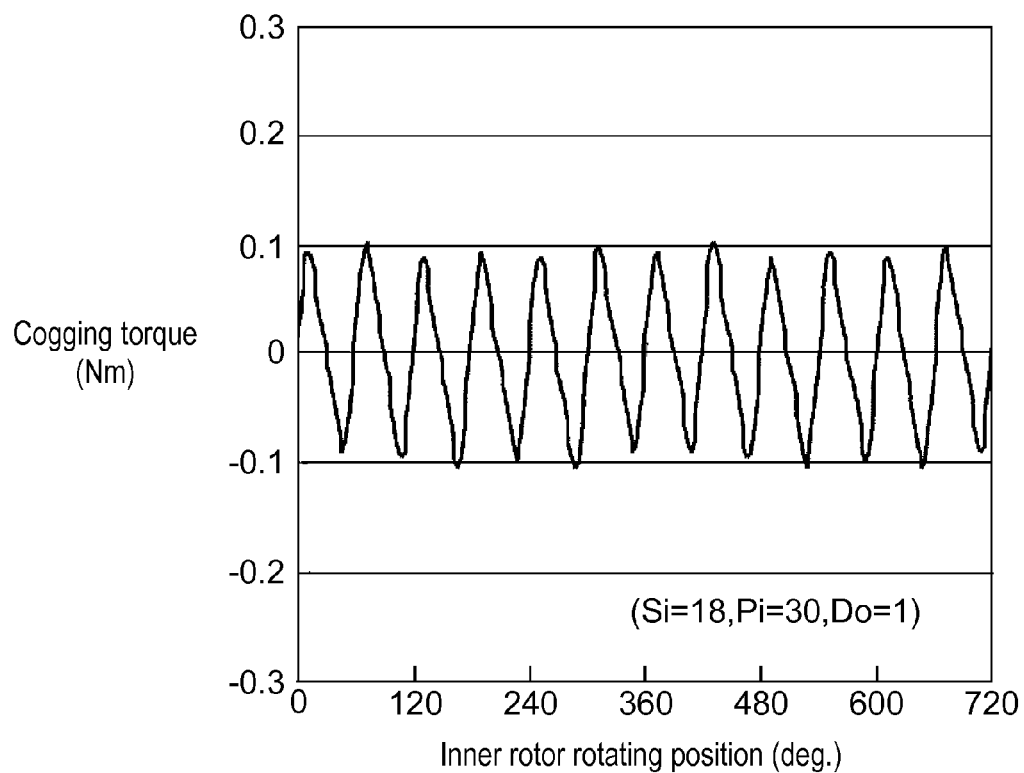
FIG. 13 shows the relationship between inner rotor rotating position and cogging torque with the inner rotor core integrally formed.

FIG. 13 shows the relationship between inner rotor rotating position and cogging torque with the inner rotor core integrally formed.

Figure 14:
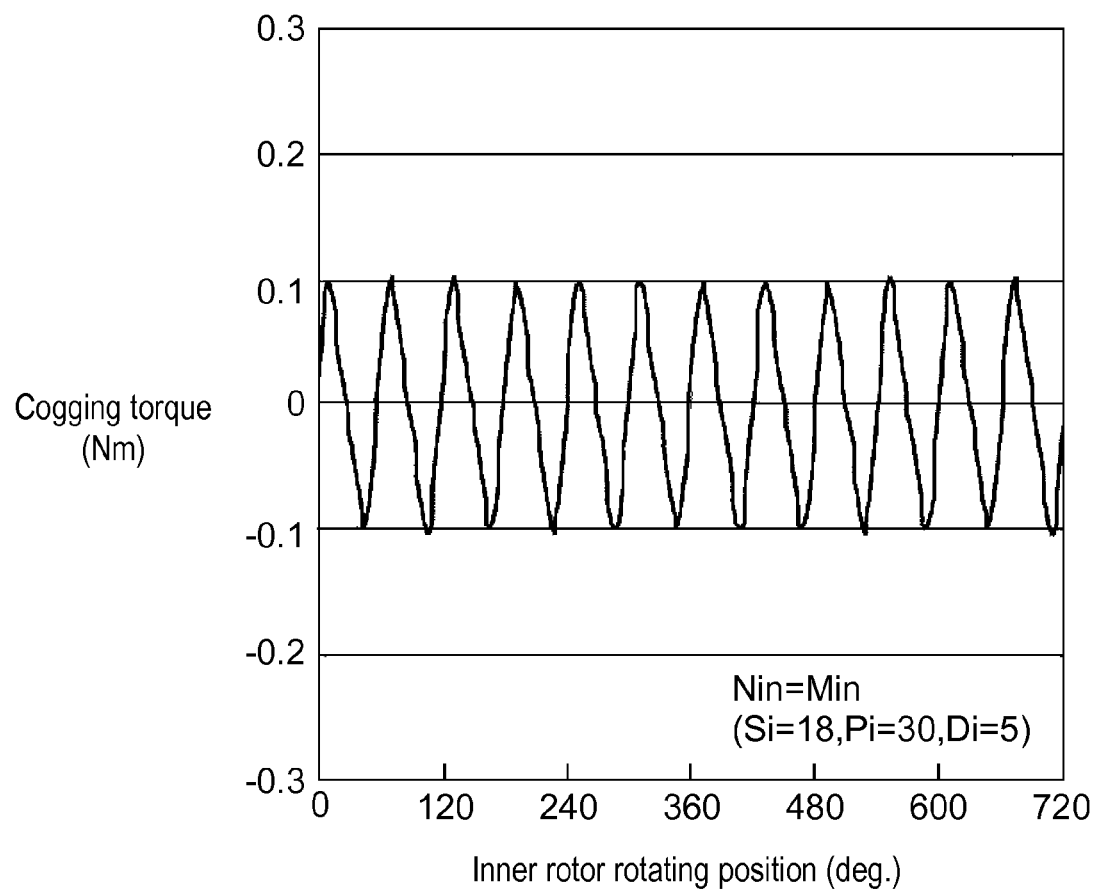
FIG. 14 shows the relationship between inner rotor rotating position and cogging torque where Nin=Min (number of inner slots Si=18, number of inner rotor poles Pi=30, number of inner rotor core divisions Di=5).

Also, FIG. 14 shows the relationship between rotating position and cogging torque of inner rotor 231 where Nin=Min (number of inner slots Si=18, number of poles Pi of inner rotor 231=30, number of divisions Di of inner rotor core 233=5).

The cogging torque shown in FIG. 13 and FIG. 14 is measured supposing that cogging torque generated due to outer rotor is zero.

As shown in FIG. 14, when Nin=Min, the characteristic of cogging torque generation is similar to the generation of cogging torque with the inner rotor core integrally formed as shown in FIG. 13. That is, the maximum value and minimum value of cogging torque are nearly identical with each other every cycle of cogging torque. And, the cogging torque is generated within a range of −0.1N·m to 0.1N·m.

As described above, in the electric motor of the preferred embodiment 2, outer rotor core 223 comprises outer rotor core materials 226 circumferentially equally divided for the predetermined number of divisions Do, and inner rotor core 233 comprises inner rotor core materials 236 circumferentially equally divided for the predetermined number of divisions Di. And, the least common multiple being Nout for the number of outer slots So and the number of outer magnetic poles Po, the least common multiple being Mout for the number of outer slots So and the number of outer rotor core divisions Do, the least common multiple being Nin for the number of inner slots Si and the number of inner magnetic poles Pi, and the least common multiple being Min for the number of inner slots Si and the number of inner rotor core divisions Di, then at least the setting is made so that Nout is equal to Mout, or Nin is equal to Min. Therefore, even in case the rotor core arranged is formed by a plurality of rotor core materials outside and inside the stator, the characteristic of cogging torque obtained is equivalent to that obtained with the rotor core integrally formed. Accordingly, also due to the preferred embodiment 2 of the present invention, in the electric motor having a rotor core formed by a plurality of rotor core materials, cogging torque can be reduced, and also, it is possible to reduce torque ripple related with cogging torque.

Also in the preferred embodiment 2, a stator whose number of slots So, Si is 18 and a rotor whose number of magnetic poles Po, Pi is 30 are used for the convenience of description. However, as described above, it is not limited to these combinations, and it is allowable to use any numerical combinations with respect to the number of slots So, Si, the number of poles Po, Pi, and the number of divisions Do, Di that is the number of rotor core materials where at least Nout=Mout or Nin=Min.

INDUSTRIAL APPLICABILITY

The electric motor of the present invention is capable of reducing cogging torque and torque ripple, and it is useful as an electric motor using a rotor core formed by circumferentially divided rotor core materials.

The invention claimed is:

1. An electric motor comprising:
a stator including a stator core having a yoke and a plurality of teeth protruded from the yoke, which is formed with a plurality of slots being S between the teeth being adjacent to each other, and winding wound around the stator core; and
a rotor rotatably held against the stator, having a rotor core and a plurality of magnetic poles being P and held by the rotor core and confronting tip ends of the teeth via gaps, wherein the rotor core is formed by rotor core materials circumferentially equally divided into a predetermined plural number of divisions being D;
P is not equal to D;
P is greater than D and S; and
the least common multiple being N for the number of slots and the number of magnetic poles, and the least common multiple being M for the number of the slots and the number of the divisions, then
N is equal to M.

2. The electric motor of claim 1, wherein D is multiple of 5.

3. The electric motor of claim 1, wherein the stator core has the plurality of teeth protruded outward of the yoke, and the rotor confronts tip ends of the teeth via gaps outside the stator.

4. The electric motor of claim 1, wherein the stator core has the plurality of teeth protruded inward of the yoke, and the rotor confronts tip ends of the teeth via gaps inside the stator.

* * * * *